(12) United States Patent
Kimbrough et al.

(10) Patent No.: US 7,917,519 B2
(45) Date of Patent: Mar. 29, 2011

(54) CATEGORIZED DOCUMENT BASES

(75) Inventors: Steven O. Kimbrough, Bala Cynwyd, PA (US); Ian C. MacMillan, Radnor, PA (US); John P. Ranieri, Wilmington, DE (US); James D. Thompson, Bala Cynwyd, PA (US)

(73) Assignee: Sizatola, LLC, Guilford, CT (US)

(*) Notice: Subject to any disclaimer, the term of this patent is extended or adjusted under 35 U.S.C. 154(b) by 0 days.

(21) Appl. No.: 11/586,306

(22) Filed: Oct. 25, 2006

(65) Prior Publication Data

US 2007/0106662 A1 May 10, 2007

(51) Int. Cl.
*G06F 7/00* (2006.01)
*G06F 17/30* (2006.01)

(52) U.S. Cl. .................. 707/749; 707/730; 707/738

(58) Field of Classification Search ............... None
See application file for complete search history.

(56) References Cited

U.S. PATENT DOCUMENTS

| | | | | | |
|---|---|---|---|---|---|
| 5,371,807 | A | * | 12/1994 | Register et al. | 382/159 |
| 5,895,470 | A | * | 4/1999 | Pirolli et al. | 707/102 |
| 5,943,670 | A | | 8/1999 | Prager | 1/1 |
| 6,185,560 | B1 | * | 2/2001 | Young et al. | 707/776 |
| 6,208,988 | B1 | | 3/2001 | Schultz | 1/1 |
| 6,233,575 | B1 | * | 5/2001 | Agrawal et al. | 707/6 |
| 6,236,991 | B1 | * | 5/2001 | Frauenhofer et al. | 707/6 |
| 6,363,377 | B1 | | 3/2002 | Kravets et al. | 1/1 |
| 6,385,602 | B1 | * | 5/2002 | Tso et al. | 707/3 |
| 6,446,061 | B1 | * | 9/2002 | Doerre et al. | 707/3 |
| 6,571,240 | B1 | * | 5/2003 | Ho et al. | 707/5 |
| 6,618,715 | B1 | * | 9/2003 | Johnson et al. | 706/47 |
| 6,751,600 | B1 | * | 6/2004 | Wolin | 706/12 |
| 7,054,841 | B1 | * | 5/2006 | Tenorio | 705/57 |
| 2001/0049677 | A1 | * | 12/2001 | Talib et al. | 707/3 |
| 2003/0101181 | A1 | * | 5/2003 | Al-Kofahi et al. | 707/7 |
| 2003/0130993 | A1 | * | 7/2003 | Mendelevitch et al. | 707/3 |
| 2003/0220912 | A1 | * | 11/2003 | Fain et al. | 707/3 |
| 2003/0220913 | A1 | * | 11/2003 | Doganata et al. | 707/3 |
| 2004/0128267 | A1 | * | 7/2004 | Berger et al. | 707/1 |
| 2005/0108200 | A1 | * | 5/2005 | Meik et al. | 707/3 |
| 2005/0120006 | A1 | * | 6/2005 | Nye | 707/3 |
| 2005/0187916 | A1 | * | 8/2005 | Levin et al. | 707/3 |
| 2006/0031218 | A1 | * | 2/2006 | Cipollone | 707/5 |
| 2006/0059185 | A1 | * | 3/2006 | Bocking et al. | 707/101 |
| 2006/0173828 | A1 | * | 8/2006 | Rosenberg | 707/3 |
| 2006/0206476 | A1 | * | 9/2006 | Kapur et al. | 707/5 |
| 2006/0206483 | A1 | * | 9/2006 | Knepper et al. | 707/7 |
| 2006/0242118 | A1 | * | 10/2006 | Engel | 707/3 |
| 2006/0242147 | A1 | * | 10/2006 | Gehrking et al. | 707/7 |
| 2006/0248078 | A1 | * | 11/2006 | Gross et al. | 707/5 |

OTHER PUBLICATIONS

CAEP: Classification by aggregating emerging patterns, Dong et al, LNAI 1721, pp. 30-42, 1999.*

* cited by examiner

*Primary Examiner* — Pierre M Vital
*Assistant Examiner* — Augustine Obisesan
(74) *Attorney, Agent, or Firm* — Montgomery, McCracken, Walker & Rhoads, LLP; Evelyn H. McConathy

(57) ABSTRACT

A method of managing information comprises generating a categorized document base. Generating the document base comprises providing a pre-existing classification of things other than documents, providing a source collection of documents, and automatically assessing the documents using Information Retrieval techniques to assign at least some of the documents to one or more taxa of the classification. For each taxon in the classification one or more numerical scores are assigned, based at least in part on a composition, makeup or constitution of the documents assigned to the taxon of the categorized document base.

34 Claims, 5 Drawing Sheets

US 7,917,519 B2

CATEGORIZED DOCUMENT BASES

CROSS REFERENCE TO RELATED APPLICATIONS

U.S. Provisional Patent Application No. 60/730,423, filed Oct. 26, 2005, is incorporated herein by reference in its entirety. U.S. patent application Ser. No. 10/272,337, filed Oct. 16, 2002, is incorporated herein by reference in its entirety. U.S. Provisional Patent Application No. 60/329,703, filed Oct. 16, 2001, is incorporated herein by reference in its entirety.

BACKGROUND

The present invention relates to statistical natural language processing, including information retrieval, information extraction, and literature-based discovery. More specifically, the present invention relates to obtaining a collection of documents that is classified or categorized by a taxonomic system identified ex ante by the user, and to using such a classified collection to obtain useful information.

Access to the right information is invaluable in the development of new ideas and business opportunities, in supporting research and investigation on virtually any subject, and generally for making good decisions and alerting decision makers to conditions that require decision making.

A large portion of the important information that is needed for decision making and that is stored electronically (and suitable for processing by digital computers) is in the form of text in documents. It is generally recognized that the current state-of-the-art in statistical natural language processing (which is the covering discipline and art for accessing information in text documents) does not support fully adequate access to information in texts.

Categorized document collections, in which individual documents (or texts) in a collection of documents are assigned to categories in taxonomic systems, are widely recognized and widely used for improving effective information access to collections of texts. Among other values, categorization serves to focus a decision maker's or investigator's attention on smaller subsets of larger collections, thereby facilitating search and retrieval. Also, the distribution of documents across categories in a taxonomic system may itself be useful information for decision making and investigation.

Examples of categorized document bases include library catalogs based on classification schemes such as the Library of Congress classification and the Dewey Decimal classification, and subject classifications such as the United States Patent Classification and the International Patent Classification. Such classification schemes conventionally require a human being to examine a book or other document, and make a decision as to what class or classes to assign to the document.

It has been proposed to classify documents, for example, documents gathered from the Internet, automatically by searching the text of the document for terms found in classification codes of an existing document classification and for terms found in an existing thesaurus to that classification. However, because the promoters of these proposals are librarians and library scientists, these proposals are typically confined to generating a library-style classified index in which each document is assigned to one or a few classification codes, and can be retrieved by searching the index under that code or one of those codes. Library indexes, even current computerized library indexes, are typically limited to a search in a single index, or a search for the Boolean intersection of two or more unrelated indexes, (for example, classification AND author), returning a single list of "hits."

There is therefore a continuing need for methods and systems that can provide more information about documents than merely assigning the document to a class within a taxonomy.

SUMMARY

The present invention is directed to methods and apparatus for creating categorized document collections from collections of documents that are not already so classified, including creating a new or distinct classification of a source collection of documents that is already categorized independently in some fashion or other.

In one embodiment of the invention, a pre-existing classification of things other than documents is provided. The classification comprises classification codes and definitions of the things belonging in each taxon of the classification. A collection of documents is provided. The documents are automatically assessed using Information Retrieval (IR) techniques to assign the documents to one or more taxa of the classification. For each taxon in the classification one or more numerical scores are assigned, based at least in part on a composition, makeup or constitution of the documents assigned to the taxon of the categorized document base.

In another embodiment of the invention, there are provided methods and systems for generating a categorized document base, comprising providing a source collection of documents, automatically assessing the documents using Information Retrieval (IR) techniques to assign at least some of the documents to one or more first categories, and assigning for each first category one or more numerical scores based at least in part on a composition, makeup or constitution of the documents assigned to the category.

In a further embodiment of the invention, there are provided methods and systems for providing at least first and second sets of categories, providing a source collection of documents, at least some of the documents assigned to one or more categories of each set of categories, and generating at least one of an array of documents and an array of data relating to documents, wherein the categories provide axes of the array.

The system may be embodied at least in part using one or more computers, and another embodiment of the invention provides programs for causing a computer to carry out the methods of the invention.

Many classification schemes are hierarchical, treelike structures, with "leaf" nodes, which are the lowest level, most specific, categories, and higher-level nodes in the hierarchy that correspond to categories composed from or including their subcategories down to the leaves. Both leaf and higher-level categories are known as "taxa." Related forms are also recognized, including simple, non-hierarchical lists of taxa, in which case all taxa are leaf nodes, excepting possibly a root node identifying the entire taxonomy. Alternatively, the graph topology of a classification system may be a network (or even a more complex graph structure), rather than the prototypical tree or simple list. In addition, a taxonomy or classification system may be faceted and attach multiple classification systems to individual entities.

In general, a "taxon" (plural "taxa") is any location within a classification system to which an item can be assigned. In particular, in a hierarchical "tree" classification the number of levels of classification may vary from branch to branch, so that a leaf taxon on one branch may be level with a non-leaf taxon on another branch. An item may be assigned to a non-leaf taxon, for example, by inheritance from a leaf, so that a higher-level taxon explicitly includes all the items in its sub-categories. Alternatively, the non-leaf taxon may be non-exhaustively sub-classified, so that there are leaves (or lower-level "twig" taxa) assignable to only some items within the non-leaf taxon, which thus becomes the lowest-level classification for items that do not have an assignable leaf.

In a further embodiment of the invention, the classified documents are then searched according to one or more criteria different from the classification, and an analysis of the number of documents in each taxon having the one or more criteria, or having a specific aspect of the one or more criteria, is generated.

This analysis may be quantitative and may constitute or contribute to the one or more assigned numerical scores. For example, the system may report the number of times a specified word or phrase occurs in a document, either directly or as a functional transformation, optionally based on other information, such as a fraction or percentage of the number of words or other measure of the size of the document, or of the total size of all the documents in the same taxon of the initial classification.

The documents may be searched and analyzed according to three or more different sets of criteria including the initial classification where applicable. The documents may be grouped according to some sets of criteria, and a report generated analyzing the documents in a group according to the other sets of criteria.

In another embodiment of the invention, documents may be automatically classified according to any pre-existing classification using IR techniques. The documents may then be searched according to a plurality of states of one or more other criteria, and an array of documents in different taxa of the classification and different states of the one or more other criteria is generated.

The one or more other criteria may be provided by one or more other classifications, in which case the plurality of states comprises assignment to taxa in the other classification. The results may then be presented and/or manipulated in the form of an array, with each distinct classification providing a dimension of the array. The one or more other criteria may be, for example, a plurality of keyword searches, in which case the plurality of states may comprise positive matches, or scores above a threshold, for different keywords. The results may then be presented and/or manipulated in the form of an array, with the classification (or each distinct classification) providing a dimension of the array, and the keyword searches (or each distinct set of keyword searches) providing a dimension of the array.

Another aspect of the present invention provides a general method for creating categorized document bases by using pre-existing taxonomies (or classification schemes) as sources of search terms for information retrieval techniques. Given a collection of documents and a classification scheme, the present method teaches ways to generate the categorization of documents in a collection in accordance with, and by actively using, a given classification scheme. While the required classification scheme must exist prior to execution of the present method, it may be created by users on an as-needed basis, e.g., immediately prior to employment of the method.

In general, a "user" of a system according to the invention may include owners or operators of the system, whether using the system for their own benefit or for the benefit of others, and customers, who are typically users of the information generated who commission an operator to prepare a classification or analysis for a specific purpose. Where an operator and a customer are involved, the functions and responsibilities of the "user" may be distributed between them according to the expertise and interests of each.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Reference will now be made in detail to various embodiments of the present invention, examples of which are illustrated in the accompanying drawings.

Figure 1:
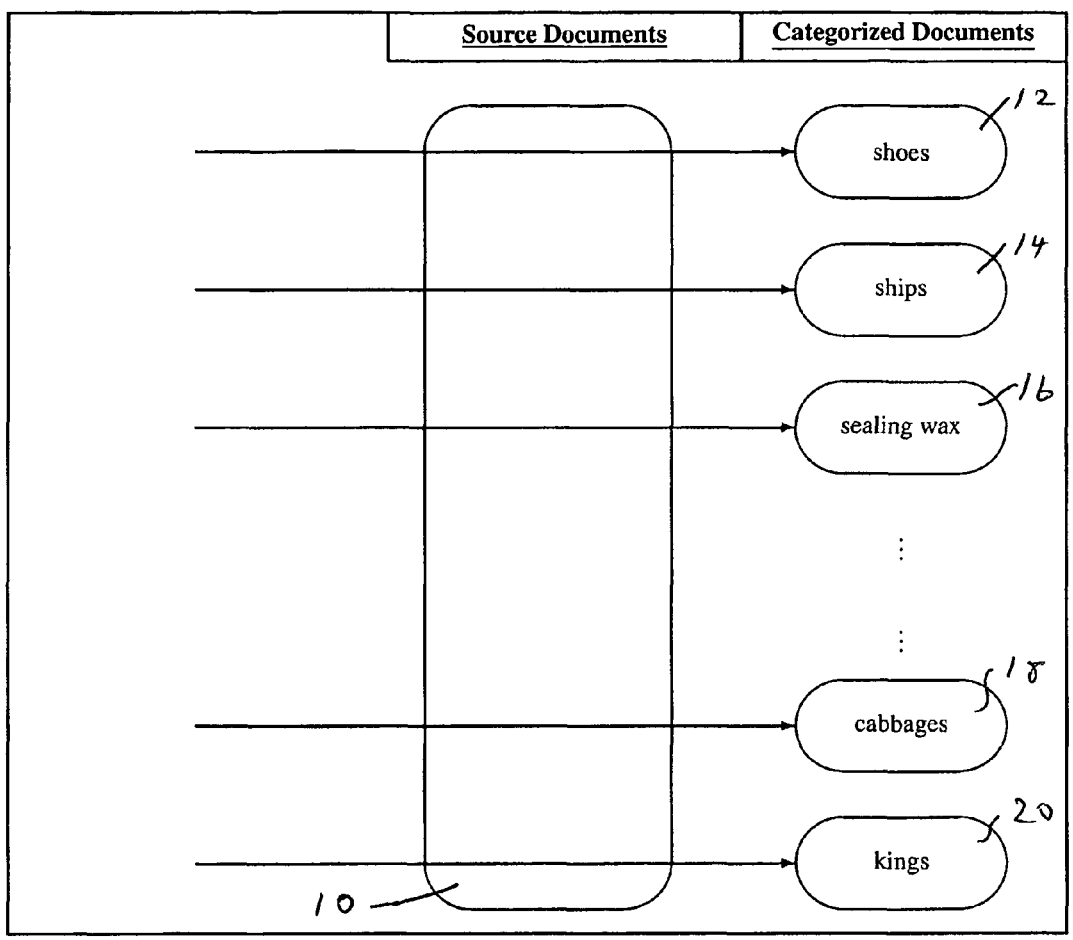
FIG. 1 is a schematic diagram of a scheme for generating a categorized document base.

Referring to the drawings, and initially to FIG. 1, in creating a generalized categorized document base (CDB), by some procedure or method documents in an existing collection of source documents 10 are assigned to, or informationally associated (as in a record in a database table, or other electronic file) with particular categories or classifications 12, 14, 16, 18, 20. This process of assignment results in sub-collections of the documents from the original collection. Each member of a sub-collection is associated with a common category or taxonomic entity (taxon). It is not necessary for every document to be assigned to some category, although that is possible. Where it is desired for every document to be assigned to a category 12, 14, 16, 18, 20, it may be necessary for the categories to include a "null" category (not shown) defined as the category of all documents not assigned to any other category. It is not necessary that every assigned document be assigned to exactly one category, although that is possible. Many classification schemes permit a document to be assigned to two or more different categories. In addition, in a hierarchical taxonomy a document may be assigned both to a fine category and to a coarse category of which the fine category is a subset.

The specific categories 12, 14, 16, 18, 20 shown in FIG. 1, which are: shoes, ships, sealing wax, cabbages, and kings, are for purposes of illustration only. The concept of a CDB can be applied to any categorization scheme.

As an example, a user may wish to categorize a collection of documents according to type of product (if any) that is relevant to the documents in a collection. The user may be a "customer." The customer is not necessarily the owner or operator of the classification system, but may be a person or organization wishing to use the classified document collection, who commissions the operator of the classification system to prepare a specific classified collection. Further, the user has a specific classification system in mind for which the user wishes to categorize a source collection of documents. For the sake of the example, let that classification scheme be the United Nations Standard Products and Services Code. With the present embodiment, this can be done by starting with a product classification system (e.g., UNSPSC) and using the system itself as an integral part of the process of creating the CDB. The present process uses information retrieval methods on any existing classification scheme and does not require specialized rule formation for matching documents to categories.

Figure 2:
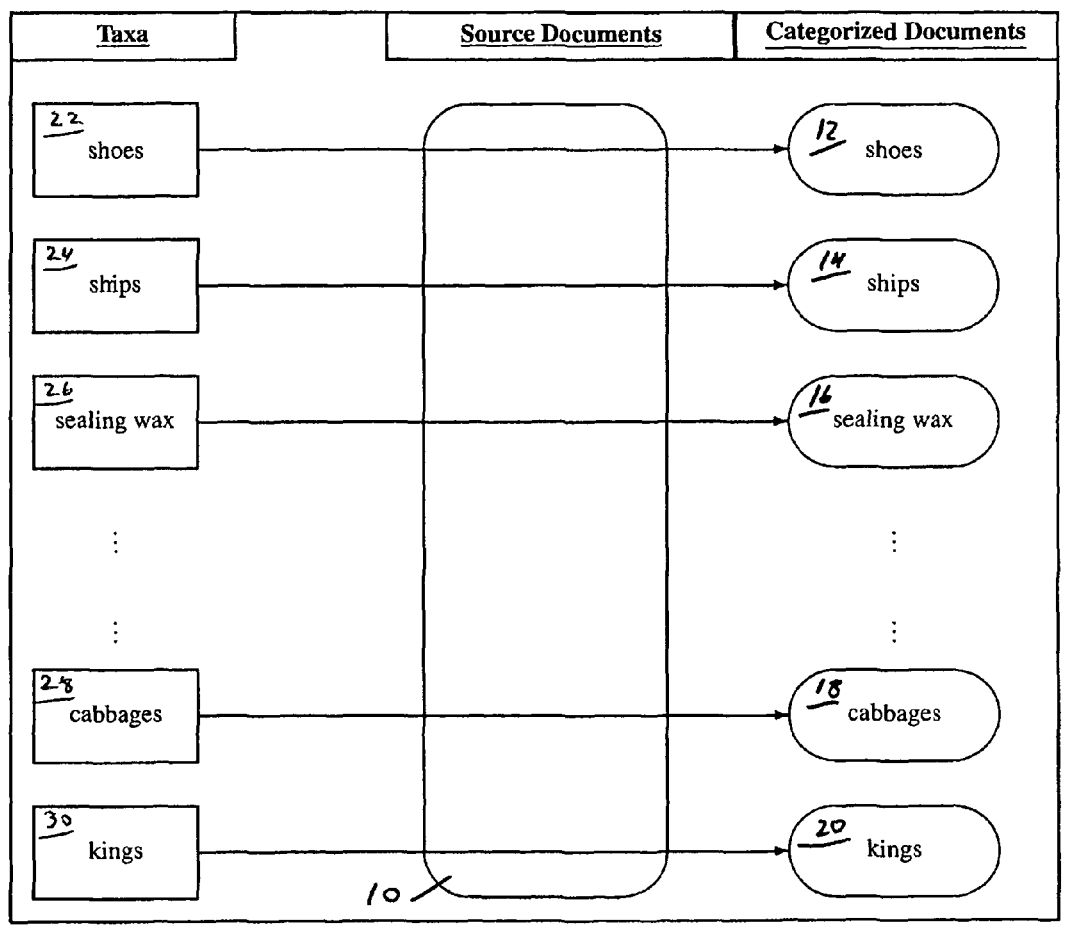
FIG. 2 is a schematic diagram similar to FIG. 1, illustrating a first embodiment of the present invention.
Figure 3:
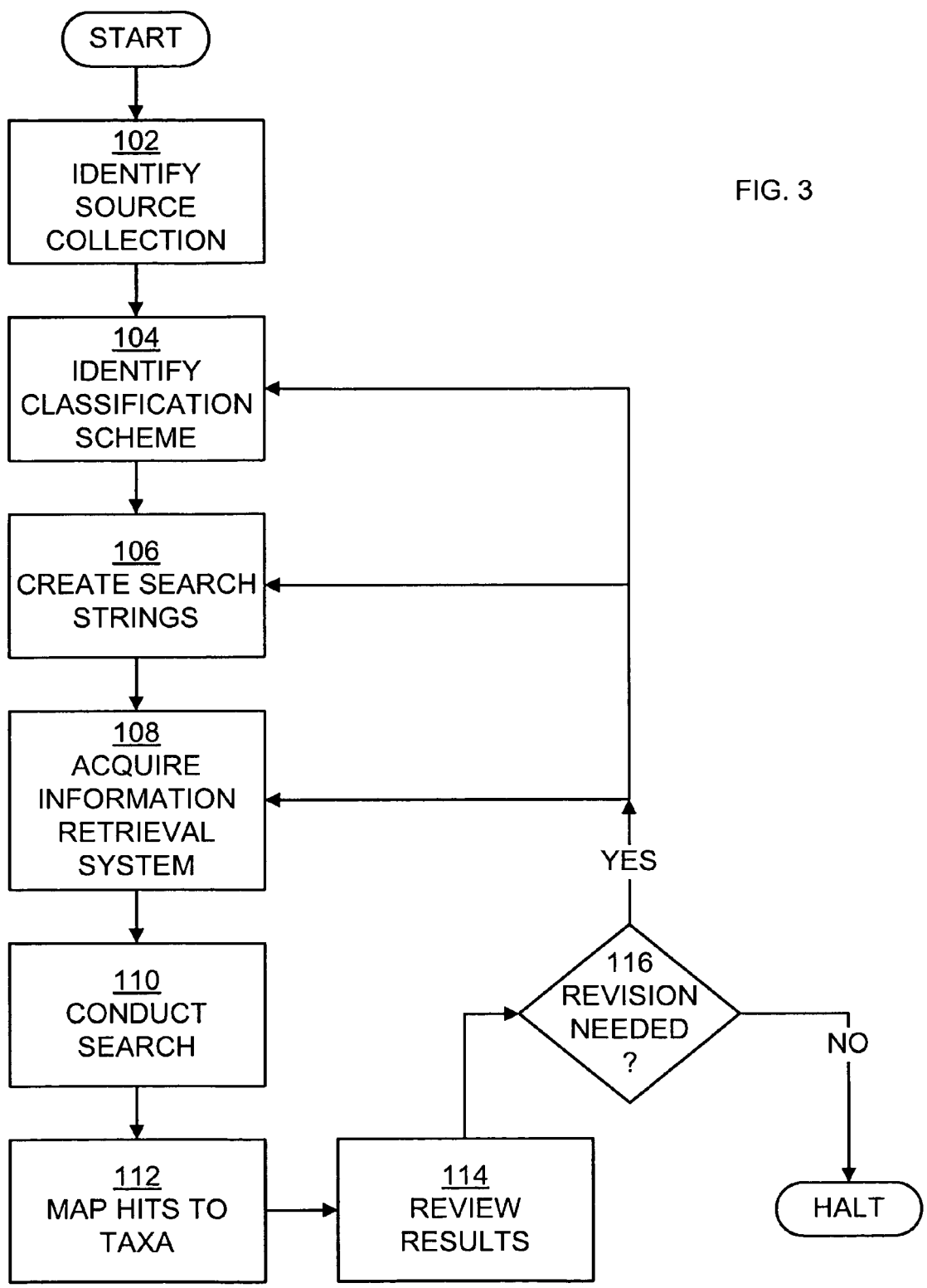
FIG. 3 is a flowchart of an embodiment of the present invention.

Referring now to FIGS. 2 and 3, in one form of method according to the present invention, in Step 102 a source document collection 10 is identified and access to the collection is obtained. Examples of source document collections include but are not limited to: documents posted on the World Wide Web, documents retrieved from the World Wide Web by one or more queries posed to a search engine, and documents retrieved from a document collection by one or more queries posed to an Information Retrieval System (IRS).

In Step 104, a classification scheme is identified. As shown in FIG. 2, the classification scheme comprises taxa 22, 24, 26, . . . 28, 30 represented by the terms shoes, ships, sealing wax, . . . , cabbages, kings. The classification scheme, and taxa, shown in FIG. 2 are for purposes of illustration only. The present process permits the use of any articulated classification scheme or taxonomy, including, but not limited to, schemes referred to by other terms of art such as "ontology," "controlled vocabulary," and "categorization scheme."

In Step 106, search queries are generated from the taxa of the classification system. The search queries may be simply keywords, or Boolean combinations of keywords, from the taxon definitions in the classification system, to be used as search strings for a text search. In general, a "search string" or "search query" may be any input to an Information Retrieval System (IRS) that provides the IRS with one or more criteria for selecting some documents from a source collection, known as "hits," and rejecting other documents from the source collection. A query that results in all or none of the documents being selected is logically possible, but usually unhelpful. Where the query is a word, phrase, or Boolean combination of words, searching may comprise searching for the exact search terms, words and phrases specified, similar words and phrases, and patterns of search terms, words, and phrases. A particular query, when applied by a particular IRS, may result in additional states other than "hit" or "not hit."

In Step 108, an information retrieval system is provided. The details of the information retrieval system depend on the source documents and the search queries. For example, in the example of a search of the World Wide Web using keywords from the taxon definitions, the information retrieval system may be essentially an available World Wide Web search engine.

In Step 110, the search is conducted, and appropriate information retrieval methods, which may be methods established in the art, are used to identify "hits," that is to say, matching documents, in the collection of source documents. For example, hits might be defined as documents containing the taxa terms. In FIG. 2 these terms are shoes, ships, sealing wax, . . . , cabbages, kings. Thus, the categorized documents for the category of shoes might consist of all the documents in the source documents collection containing the word shoes, and similarly for the other taxa.

In Step 112, the discovered associations between taxa and their hits are recorded in electronic form for convenient retrieval and subsequent use. For example, the information may be recorded in a relational database or in a variety of purpose-built file formats. The discovered associations define the sub-collections of documents 12, 14, 16, . . . 18, 20. It is not always necessary, though it is sometimes possible, to generate sets of copies of the documents in each sub-collection. Depending on the nature of the source documents, it may be preferred to generate only a listing that identifies the documents and their locations or, as described below, some intermediate amount of information.

A wide variety of procedures are available from the field of information retrieval for using search terms to obtain hits from a collection of source documents in Step 110. Any of these methods may be employed in the context of the present embodiment, by using taxa descriptions ("shoes," "ships" and so on in the example) or expansions thereof (e.g., synonyms, hypernyms, hyponyms) as search terms.

The method of FIGS. 2 and 3 applies as well to iconographic taxa, such as images or patterns, which may be matched to non-textual documents or parts of documents. However, classification of images is not well advanced, and usually relies on classifying a verbal description of the image, or of the object depicted in the image, rather than the image itself. Because unrelated objects can have very similar appearances, and because the same object or objects of the same description can have very different appearances, the construction of a thesaurus of image descriptions is much harder than the construction of a thesaurus of words, and classifications of images are typically far less reliable than classifications of text documents.

Matching of taxa to documents (using information retrieval techniques, or other techniques appropriate for iconographic taxa) does not have to be exact. For example, there are known information retrieval techniques that will rank an entire collection of documents based on a single search term, whether or not it occurs in all of the documents. It is possible, and appropriate, that under such a ranking a document might have a high relevance score and not contain the exact search term. In any event, using a taxon or a related expression as a search term, there are information retrieval methods that will rank a document collection by relevance and/or return a relevance score for a number of documents. These scores may be used to determine whether a document is assigned to a specific taxon.

For example, if the search term is "shoes" (and if matching is restricted to exact matches to the text string "shoes"), and if the information retrieval method employed gave ranking scores or relevance scores to some or all of the documents in the source collection, then the documents assigned the category of "shoes" could be those documents with a specified, sufficiently high score, for example, the top 500 documents, or all documents mentioning "shoes" at least 20 times. Setting a high threshold for relevance or ranking typically results in collections of documents with high relevance, but may result in documents of moderate relevance being excluded, and may result in a substantial number of documents from the original collection being disregarded or assigned to a "null" or "null with respect to matching" category even when the taxonomy is in principle exhaustive.

Figure 4:
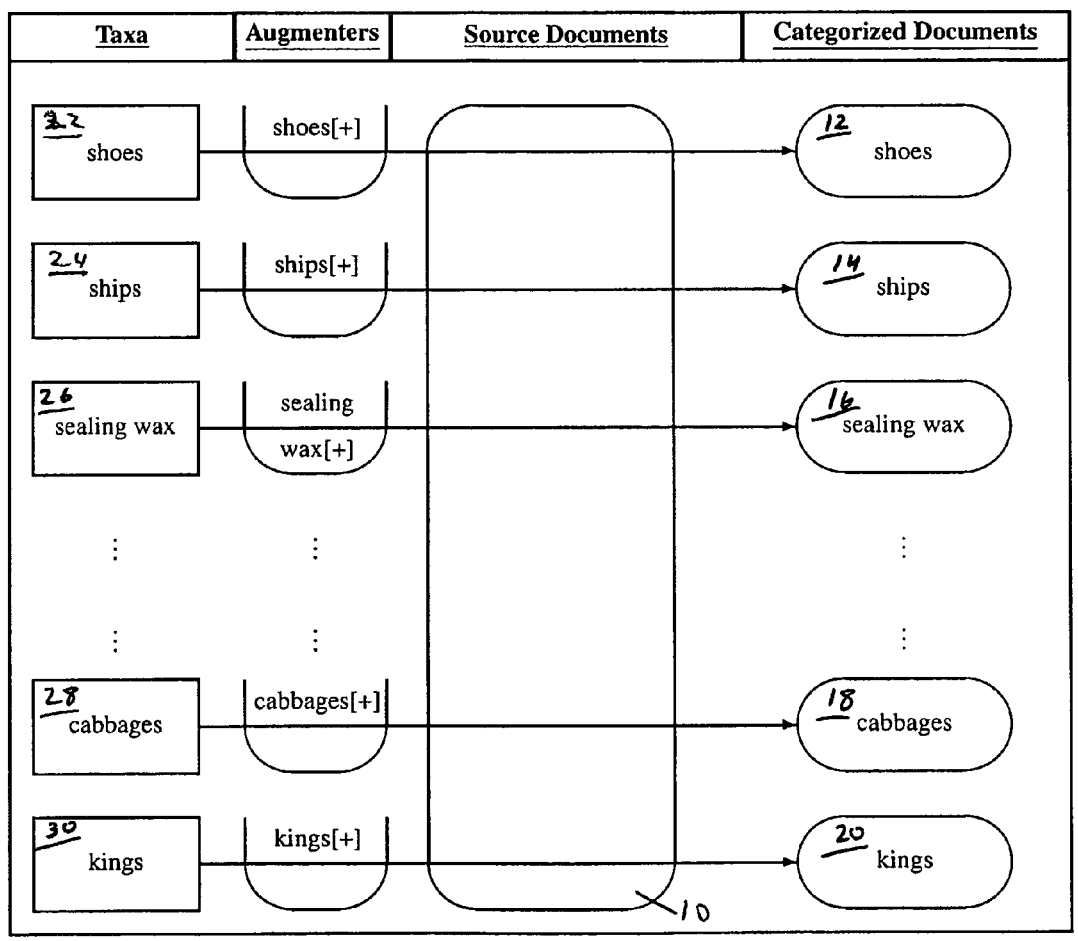
FIG. 4 is a schematic diagram similar to FIG. 2, illustrating a further embodiment of the present invention.

Referring now to FIG. 4, a further embodiment of the present method differs from the embodiment shown in FIG. 2 only in that the taxon descriptors are augmented with additional information when used in Step 106 as input to the procedure for creating queries. One example of augmentation is known in the information retrieval literature as query expansion. Under a query expansion regime, taxon descriptors would be augmented with related terms, e.g., to "shoes" the search terms "shoe," "boot," "footwear" and so on might be added and this augmented list would be used by the information retrieval engine to identify hits. The pre-existing taxonomy used to define the taxa may have a pre-existing thesaurus of approximate synonyms to the taxon descriptors.

Techniques for query expansion and for other forms of query augmentation are well known in the field of information retrieval. The present processes employ them innovatively, for augmenting categorization descriptions for the purpose of creating taxonomically generated categorized document bases.

As a second example, taxonomic descriptions may be augmented by entire documents, following the concept of "exemplary documents." Thus, for example, the taxa may be used to search for highly relevant documents, and then the most relevant documents may be used to augment the taxa representations for the purpose of directing an information retrieval system to find documents ("hits") fitting the taxa. Also, many classification schemes, particularly thesauruses, are attended by textual information elaborating on and clarifying the meanings of the various taxa descriptors. The term "scope note" is often used in this sense. The text of the scope notes may then be used in augmenting the taxon descriptions.

In a further example of a method according to the embodiment of the invention shown in FIG. 3, in Step 102 a user wishing or intending to obtain a categorized document base (or collection) identifies a document base (or collection) of source documents. Examples of possible sources for the source document collection are identified elsewhere in this specification. Specifically, the collection of documents may include a pre-existing search database, for example, the United States Patent and Trademark Office (USPTO) patent and application database, private collections, government documents, online databases and collections associated with search engines, such as Google, Dialog, Medline, Lexis/Nexis, etc. The collection of documents chosen depends on the user's intended use of the categorized document base and the available taxonomies and search engines to effect the classification. It should be noted that the choice of the collection of documents is not limited to choosing one collection; multiple collections of documents may be utilized. If the source document base or collection is a proprietary collection, or includes proprietary documents, the user obtains the appropriate permissions.

The collection of documents may be a collection that was generated by a process according to the present invention. Embodiments of the present invention produce a number of files that contain hits from past searches. These past search files may be used as starting collections to conduct more narrow searches.

Once the user has identified and secured access to a collection of source documents, a classification scheme, or taxonomy, for generating queries is retrieved by the user, in Step 104. As discussed above, the "classification schemes" or "taxonomies" are methods of categorizing information using a predetermined set of criteria.

An exemplary pre-existing classification that may be used in this step is the Library of Congress (LoC) classification scheme.

In order to conduct the search, in Step 106 one or more queries are generated. In one example in the basic Taxonomically Generated Classified Document Base (TGCDB) case, the queries are search strings generated by simply using n-grams that describe the taxa of the classification scheme. An "n-gram" is defined as a sub-sequence of n items from a given sequence, and in text processing is then usually a phrase of n consecutive words. Each query is constructed so as to be associated with a taxon in the classification scheme. In some cases, a single query may be associated with more than one taxon, if the query is so framed that a more informative result than a simple "match" or "no match" can be obtained.

Based in part on the collection(s) of documents that have been chosen, in Step 108 an appropriate Information Retrieval System (IRS) is acquired. The IRS will be the query and retrieval system that actually identifies hits (documents) associated with the queries that have been generated in Step 106. Preferably, a generally available IRS, which may be an already known IRS, is chosen, although an IRS may be utilized that has been designed to conduct a search in accordance with an embodiment of the present invention. The IRS may be a proprietary system for proprietary collections, a standard search engine for Internet documents, a commercial information retrieval engine, or a purpose-built system for example. Especially where the collection identified in Step 102 is a combination of collections with materially different characteristics, two or more different IRSs may be selected. For example, where part of the documentation forming the source collection is in a highly structured proprietary database and part of the documentation is on the World Wide Web, a specific proprietary IRS may be used for the proprietary database, and a standard search engine may be used for the Internet documents.

In Step 110, the queries identified in Step 106 are input in the IRS(s) chosen in Step 108, and a search is conducted through the source collection to find all hits that match the query, or match the query to a sufficient degree. A "hit" is defined as a record (document, or document ID) returned by an IRS using any of a variety of information retrieval procedures when the IRS matches the document, or the document to which the ID relates, to the query or one of the queries. The match may require a score for the quality of matching.

In Step 112, a record is created and stored for each hit, thereby linking each hit (document) with a taxon in the classification scheme. After determining how the hits are to be associated with the classification scheme taxa, mapping of the hits to the appropriate taxa is performed, building a mapping table (index table). An exemplary mapping table is illustrated in Table 1.

TABLE 1

| Classification Scheme | Taxon | File ID |
| --- | --- | --- |
| UNSPSC | Birds and fowl | 1-6417153.html |
| UNSPSC | Live chickens | 1-6417153.html |
| UNSPSC | Live ducks | 9-6380149.html |
| UNSPSC | Live turkeys | 10-6379753.html |
| UNSPSC | Live geese | 14-6360374.html |
| UNSPSC | Live geese | 3-6416624.html |
| UNSPSC | Live pheasants | 2-6416633.html |
| UNSPSC | Live fish | 10-6379753.html |
| UNSPSC | Live salmon | 2-6416633.html |
| UNSPSC | Live trout | 12-6376045.html |
| UNSPSC | Live tilapia | 9-6380149.html |
| UNSPSC | Live tilapia | 12-6376045.html |

The mapping table shown in Table 1 comprises, for each hit, the taxonomy, the classification node (taxon) ID and a file ID. In the example, the taxa descriptors themselves, which are used as inputs to the IRS, also serve as node IDs. It is of course possible to have separate representation systems for node IDs and n-grams that describe nodes. The file ID identifies a matched document. In this example, the matched document is the actual hit, and where more than one document is assigned to a single taxon the mapping table contains a separate row for each document. Alternatively, the mapping table may have one row per taxon, and the identified document may then be a second-level table generated in Step 112 listing the hits matched to the taxon in question.

Any other information may be included in the mapping table, depending on the information to be provided. Where users may choose among available IRSs in Step 108 and/or may select which retrieval algorithms are to be employed within a particular IRS in Step 110, the mapping table may specify which IRS(s) and/or algorithm(s) were used to generate each hit.

In the embodiment illustrated by Table 1, each hit is given an ID, has its text processed for convenient display, and is then written to a unique HTML file (in a preferred embodiment), suitable for subsequent viewing through a standard web browser.

The mapping table is stored and utilized in creating classification node files. A "classification node file" is a file, record, or other way of recording information that comprises information, including statistical information, regarding the hits associated with each node or taxon in the classification scheme. This information includes at least the actual hits that were retrieved and associated with the node, and in a hierarchical scheme the number of files associated with the direct and indirect children of the node or the node itself, and may include any other information as desired. The classification node files allow the user to navigate through the retrieved information such that an individual would be able to see how many documents are associated with some classification and view the hits that are linked to the classification node. In a hierarchical system, each parent node is linked to its respective children, and so on.

In an alternative embodiment, information included in the classification node files can be displayed in an electronic tree, allowing the user to navigate through the retrieved hits faster since the user is able to see the tree and what each node means, as well as see the statistics regarding what was found and actually view the hits under particular classifications.

In an alternative embodiment, the IRS produces a numerical score for some or all of the documents in the source collection, which score estimates the relevance or degree of fit of the document with the query. In this case, a hit may be any document receiving a score, or any document receiving more than a threshold score, and the mapping table in Table 1 may then include an additional column of information, with the heading of "Score," and the data cells in that column could provide a field storing the match or relevance score of the document identified in the "File ID" column with respect to the taxon from which the query was derived.

Each hit record in, or linked from, the mapping table may include the entire document that contains a match to the query, or may contain information about the original document, such as the title, author(s), ISSN, abstract, etc. The type of information included with the hit is dependent on the user's ability and permissions to access the information in the IRS and the information provided by the IRS. Some IRSs, especially dedicated search engines for proprietary databases, do not have access to entire documents and only provide citations of relevant documents or abstracts thereof. Accordingly, the results of string searches on the chosen IRS(s) may result in one or more files that include a combination of document descriptions and full-text documents that are related to the identified queries. Alternatively, some or all of the hits may contain only a link or other reference to the original location of the document.

In an alternative embodiment, in Step 114 the user may filter the hits retrieved, by reviewing the hits and determining whether the hit is reasonable in view of the purposes for which the categorized document base (CDB) is being constructed or in view of predetermined parameters set for a given search, e.g., industries that should not be considered, types or formats of documents that should not be considered.

For example, in Table 1, only one of the documents identified as relating to specific species of bird was also identified as relating to "birds and fowl." The number of hits on "birds and fowl" may depend on whether "birds and fowl" is treated as a 3-gram for the exact phrase, as a Boolean "birds AND fowl," or a Boolean "birds OR fowl." If the results are not what the user desired, it may be appropriate to reformat the search string or other query to compel a different interpretation of "birds and fowl." In addition, or in the alternative, it may be appropriate to specify within the taxonomy whether or not the generic taxon "birds and fowl" includes all documents that are assigned to specific species of bird.

In addition, the only document assigned to two different species of fish is 12-6376045.html, which is assigned to both "tilapia" and "trout." This may suggest that there has been an alphabetical grouping of fish within the source documents that can be used or that should be compensated for.

In Step 116, the user decides whether it is useful to reclassify the source document collection, for example, because the review in Step 114 has led to a material change in the taxonomy or a material refinement of some or all of the queries, or has led the user to realize that a different IRS would be more effective. If the user deems it useful to conduct a new classification, the procedure continues by looping back to Step 104, Step 106, or Step 108.

If the user is content not to reclassify the document collection, the procedure halts (is either terminated or suspended).

After the hits are identified and mapped to the taxa in Step 112, the system may prepare a report on the documents in each category, which provides, for example, available bibliographic data in a standard form, an abstract if one was provided at source, cross-references to other hits in the same or closely related taxa, an analysis of frequent or unusually frequent words in the text of the hit, or any other information that can be automatically retrieved or generated from the source document and that will or could be useful to a person interpreting the results in Step 114.

Referring now to FIG. 4, a further embodiment of the invention uses an augmented TGCDB (Taxonomically Generated Classified Document Base) procedure. In one basic embodiment of the procedure described with reference to FIGS. 2 and 3, search strings are created in Step 106 by using the literal n-gram form of the taxon descriptors of a chosen classification scheme. Those search strings are then fed sequentially to an IRS and hits are identified.

However, there are a variety of known ways to augment an n-gram to be used for purposes of searching with an IRS. Many of these ways are forms of query expansion, that is to say, of adding search terms to a user's existing search terms, or query (here, the n-grams constituting the taxon descriptors of the chosen classification system). The augmentation is typically intended to improve precision and/or recall, by finding "hits" that do not match the literal n-gram.

The additional terms may be taken from a thesaurus. For example a search for "car" may be expanded to: "car OR auto OR automobile." Where the IRS does not provide stemming, automatic truncation, or support for inflected forms, the search for "car" may also be expanded to: "cars OR autos OR automobiles." Users, or others, can add additional terms or even sentences and paragraphs. The additional information can be added either manually or automatically. The additional terms may also be taken from documents that have been specified as being highly relevant or exemplary in the sense described above. (This kind of expansion is the basis for the "more like this" feature of some search engines.) Further, the extra terms can have positive or negative weights. That is, the added terms (or n-grams) may come with instructions to the IRS that encourage it to find documents containing the terms or matching to the terms; similarly the IRS may be instructed to avoid returning or scoring highly an added search n-gram.

In addition to query expansion, there are other ways of employing augmenting information. Principal among these in the context of the present embodiment is the association of entire documents, ranging in length from short paragraphs to substantial reports, with the taxa of a classification scheme. This eventuality affords use of additional Information Retrieval algorithms for search and relevancy determination.

A user's decision to use augmenting information may impact a number of steps in the procedure. Different classification systems may serve similar purposes, but some may have more or better-quality augmenting information than others. Some classification systems, in fact, are originally constructed with augmenting information attached to each taxon. This information is often referred to as "scope notes." For example, The UNESCO Thesaurus also includes scope notes (SN) which explain the meaning and application of terms, and French (FR) and Spanish (SP) equivalents of English preferred terms. In an alternate preferred embodiment, users may choose which of the available augmentation information for a classification system is to be used in constructing search terms and queries.

A user's choice of IRS in Step 108 may be affected by which classification system is chosen, which augmenting information is to be used, and which search methods the user prefers to use. As in the basic TGCDB procedure, users may choose among available IRS(s), and within a particular IRS may select which retrieval algorithms are to be employed.

In alternate preferred embodiments, the mapping of document hits to taxa in Step 112 of either the basic TGCDB procedure or the augmented TGCDB procedure may itself be augmented in a number of ways using Information Extraction techniques.

Information Extraction (abbreviated IE) is the automated analysis of unrestricted text in order to extract information about pre-specified types of events, entities or relationships. In various embodiments of the present invention, IE methods may be applied either to the documents in the collection of source documents identified in Step 102 of either the basic or augmented procedure or to the "hits" identified by the IRS in Step 110 of either procedure. IE methods may be applied for such purposes as extracting "sponsor" links or other information present in Web pages returned by Internet search engines, and extracting other useful facts and data items from documents, as in, for example, extracting date, assignee, title, etc. information from patent documents. In the same spirit, other document information may be obtained and recorded, such as the length or number of words in a document, its format, whether it has images, etc. In alternate preferred embodiments IE methods are applied, information is extracted and, in Step 112 of either procedure, the information is mapped to the document IDs.

Figure 5:
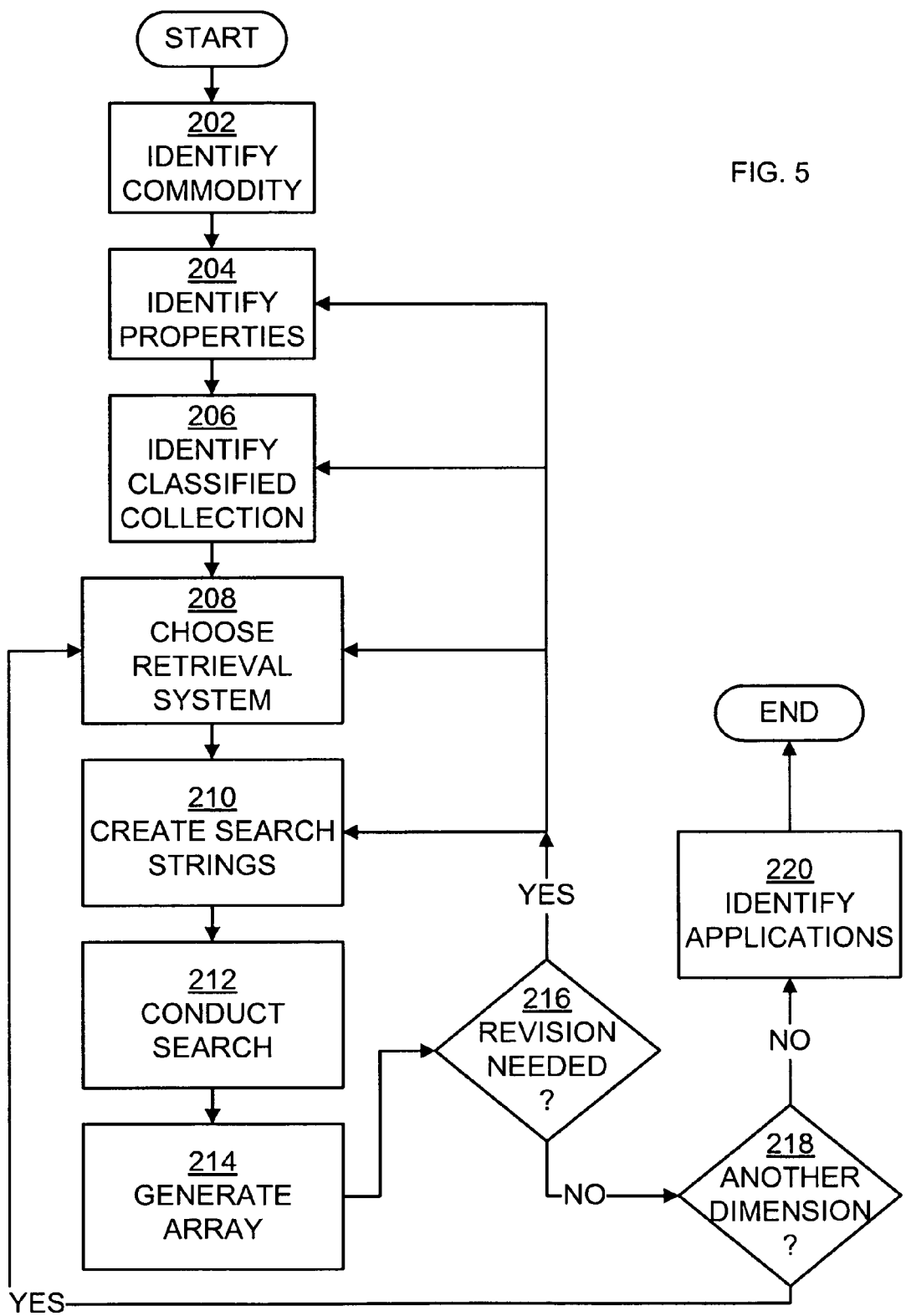
FIG. 5 is a flowchart of another embodiment of the present invention.

Referring now to FIG. 5, in one method of interpreting classified data, a set of documents classified according to a taxonomy is provided. The classified documents are preferably, but not necessarily, the output from Step 112 of any of the processes and systems described with reference to FIGS. 2 to 4 above. Alternatively, the following steps of FIG. 5 may be carried out using one or more CDBs independently created by an arbitrary method.

The documents are searched according to one or more queries or search criteria different from those used to classify the documents according to the taxonomy. An array is then generated in which each cell corresponds to documents that are assigned to a specific taxon in the initial classification and that match a specific query in the further search.

The different queries may be search strings or other queries derived from taxa of a different taxonomy. Where the source document collection has already been separately classified under both taxonomies, and the documents themselves are clearly identified in the mapping tables from both classifications, the further search may be carried out by identifying which two taxa each document is assigned to in the two mapping tables, and assigning that document to the cell of the array that corresponds to that pair of taxa (or each of those pairs, where one or both taxonomies allows multiple classifications).

Preferably, however the second search is based on a plurality of keywords that do not form a comprehensive taxonomy.

For example, the present embodiment includes a search method and system for matching a given commodity with known and unknown applications, uses, markets and/or industries. The term "commodity," as used herein, is construed broadly to include, but not be limited to, a technology, methodology, an idea, an invention, a product and services, which may be actual, envisioned, or even hypothetical. A commodity's properties and descriptors, which may include not only known properties but also inferred, hypothesized, or conjectured properties, are then used as the basis for the queries for the further search. Documents that are associated with and are about these properties and descriptors are then mapped by the array to a classification scheme of interest, which may suggest hypotheses regarding new properties or applications of the commodity. In particular, if a commodity's known properties are associated with additional properties that fall into a certain category, e.g., taxon A, then the definition of taxon A can be used to suggest new properties of the commodity. For example, if antiangiogenesis is a property associated with thalidomide, and many of the documents retrieved using the Information Retrieval techniques are not about thalidomide, but they are about antianiogenesis, and the documents regarding antianiogenesis may be classified as documents about cancer treatments, then there is a presumptive connection between thalidomide and cancer treatments.

In more detail, in Step 202, therefore, a customer or other user wishing or intending to obtain information regarding a certain commodity, as defined above, identifies a commodity to be matched with one or more novel uses, applications, markets or industries. For purposes of this disclosure, "markets" refers to connections between ideas and commodities that may or may not have been previously considered.

Once a commodity has been identified, in Step 204, known properties, attributes, descriptive terms, etc. are developed for the identified commodity. The known properties and descriptive terms may include, but are not limited to, known characteristics of the commodity, known industries associated with the commodity, attributes of the commodity, such as its texture, use, associations, designations and the like. These descriptive words and properties may be derived from dictionaries and thesauruses, for example, or generated by an automated means, such as an electronic thesaurus or electronic means. It should be noted that the properties and descriptive words may be unlimited and may go beyond words that specifically describe the identified commodity, which can be generated, e.g., via a process of structured interviews, careful reading of known source materials, and feedback from experts. Returning to the earlier example, for instance, properties relating to the term thalidomide may be very diverse, including, e.g., causing relaxation, teratogenesis (causing birth defects), and antiangiogenesis (inhibiting formation of blood vessels).

Once the properties have been generated, a relevant classified collection of documents to search is identified in Step 206. The collection of documents, and the taxonomy by which those documents are classified, may include any of the collections of documents mentioned elsewhere in this application. The collection of documents chosen depends on the commodity identified and the generated properties. The classified collection may be generated using the process of FIG. 3 when it is required in Step 206. Alternatively, the operator of the system may maintain a library of classified collections of documents formed by classifying well-known source collections according to recognized taxonomies, and the customer may then choose from such a library, avoiding the effort and delay that would be involved in generating a classified collection to the customer's order. In choosing the appropriate classified collection, the customer may make use of various kinds of information about the source collections, the classification schemes, and the classified collections that are available. Such information may include notes on intended uses and origin from the creators of the classification scheme, and/or user reviews and evaluations of a classification scheme.

Based in part on the collection of documents that have been chosen, an Information Retrieval System (IRS) is acquired or selected in Step 208. The IRS may be, for example, any of the IRSs mentioned elsewhere in this application.

In order to conduct the search using the IRS(s) chosen in Step 208, queries must be generated in Step 210. The queries may be search strings. Search strings are then preferably generated by combining one or more of the properties that were generated in Step 204. The combinations may be arranged using Boolean connectors, e.g., AND, OR, including connectors that are not strictly Boolean, but are generally referred to as such, for example, "in the same sentence as," etc. The search may be broadened, either in forming the search strings or in configuring the IRS, to include, for example, pattern matching for words or phrases similar to those in the search string, or association searching using thesauruses, scope notes, and so on. Although a Boolean search is preferred, any type of search may be utilized that takes the generated properties and forms a search string. The generated search strings or other queries are used to search the selected collection(s) of documents.

In FIG. 5, Step 210 of creating the queries is shown after Step 208 of choosing the IRS, whereas in FIG. 3, Step 106 of creating the queries is shown before Step 108 of choosing the IRS. Either order may be followed, or the steps may overlap or interact. In particular, a customer, operator, or other user may choose specific queries that express the customer's interest cogently, and select an IRS that can apply those queries quickly and effectively, or the user may select an IRS that can search the classified collection effectively, and frame queries that the selected IRS can apply efficiently.

In an alternative embodiment, a method is utilized which automatically generates the queries. This alternative method takes the generated properties from Step 204 and creates a plurality of possible combinations of the properties alone and together with other properties. Once all possible combinations have been generated, a search is conducted for each combination using the IRS(s) chosen in Step 208. The number of hits found for each of the combinations is tallied and utilized to determine the best queries based on predetermined criteria, for example, that the number of documents found must be within a predetermined numerical range. The numerical range may have both upper and lower limits. The combination queries that meet the predetermined criteria are utilized as the queries for the substantive search in Step 212.

In Step 212, the queries found in Step 210 are input in the IRS(s) chosen in Step 208, and a search is conducted to find all hits that have the query located therein. A "hit" is defined as a record returned by an IRS, broadly construed. The hits that are found are identified, counted and saved.

Where the documents referenced, directly or indirectly, in the mapping table for the original classification and stored in association with the mapping table contain the entire text hits from the search on which the original classification was based, the search in Step 212 may be conducted on those documents. Where those documents contain less than the whole of the hits, for example, contain only bibliographic data where at least an abstract is available, contain only an abstract where a fuller text is available, or contain only pointers to the original documents, the search in Step 212 may involve tracing and searching the original documents.

In Step 214, the results of string searches using the chosen IRS(s) on the classified documents are presented in an array of files that may include a combination of document descriptions and full-text documents that are related to the identified commodity's properties and attributes chosen in Step 204. Positions along the axes of the array typically represent a taxon within the initial classification in one dimension, and the different queries of Step 210 in the other dimension.

The array generated in Step 214 may be embodied in a user interface, which allows users ready visual access to information in the form of a table, or may be embodied as non-visualized data structures in a computer program and, as such, searched and otherwise manipulated by a computer program.

In schematic form, the array generated in Steps 206 to 214, which is a "classification-query" mode of generation, may be represented as in Table 2.

TABLE 2

| Taxa: | Queries: | | | |
|---|---|---|---|---|
| | $Q_1$ | $Q_2$ | ... | $Q_n$ |
| $T_1$ | s(1, 1) | s(1, 2) | ... | s(1, n) |
| $T_2$ | s(2, 1) | s(2, 2) | ... | s(2, n) |
| . | . | . | ... | . |
| . | . | . | | . |
| . | . | . | | . |
| $T_m$ | s(m, 1) | s(m, 2) | ... | s(m, n) |

In a preferred embodiment the table is produced as follows. First, a categorized document base (CDB) is created using m taxa, $T_1, \ldots, T_m$, based on a source collection of documents, C. In consequence documents in C are associated with each of the taxa $T_i$. If some taxa have no associated documents, the associated scores for the row of the table are nulls, 0s, some other indicator that can be correctly handled in the specific implementation. The CDB is provided in Step 206.

Second, in Step 210 a number n of queries $Q_j$ are identified. The queries may be, for example, n-grams representing keywords or phrases, or collections of n-grams combined with operators from an extended Boolean matching system, or even entire documents.

Third, using IR methods or other suitable methods in Step 212, each query is assessed with respect to the documents categorized by each taxon. In effect, m document collections are separately queried n times (once for each query) for a total of m×n query processing events. In each case (of applying a query, $Q_j$, to the documents associated with a taxon, $T_i$) one or more statistics, s(i, j), are obtained for characterizing the cell of the table (i.e., the document collection associated with $T_i$ as queried by $Q_j$). Statistics which may be obtained in this fashion include, but are not limited to:

1. The number of documents (in a taxon) for which the query exactly matches or has a certain degree of match to a string or string pattern (for example, a query string "organic compounds?" might indicate a patterned query which matches to either "organic compound" or "organic compounds");

2. The total number of times the query is matched in the taxon documents (possibly many times in a given document);

3. The proportion of documents in the taxon which match the query, or that match above a certain threshold, for example, for the number of hits in the document;

4. The percentage of the C documents (documents in the source collection) that match to both taxon $T_i$ and query $Q_j$.

5. An IR matching score (e.g., number of documents hit, relevance score, rank, probability of relevance, etc.) for cell $(T_i, Q_j)$, that is, for the IR match of $Q_j$ to $T_i$ or the IR match of $T_i$ to $Q_j$.

6. The number of times the query is matched in the highest-matching document in the taxon $T_i$, or in the query $Q_j$; and 7. Functional transformations and combinations (possibly including other information) of the above, including but not limited to lift and receiver operating characteristic (ROC) curve calculations (involving multiple taxa), smoothing functions (e.g., converting integer scores to real numbers), and other calculations for such purposes as exploratory data analysis (e.g., means, medians, box plots, etc.).

Extensive diagnostic reports may be produced for a cell. One such report is a table of statistics on co-occurrence of terms in the documents associated with the cell.

In addition, scores may be reported as complex data structures. For example the distribution of matches in a category may be presented in some form (such as a box plot or an array of values). In one preferred embodiment, a number of scores (simple and/or complex) are made available to the user or to a program executing on behalf of the user.

In an alternative embodiment, marginals are determined and displayed for taxa, queries, or both, as illustrated schematically in Table 3.

TABLE 3

| Taxa: | Queries: | | | | Taxa Marginals: |
| --- | --- | --- | --- | --- | --- |
| | $Q_1$ | $Q_2$ | ... | $Q_n$ | |
| $T_1$ | s(1, 1) | s(1, 2) | ... | s(1, n) | m(T, 1) |
| $T_2$ | s(2, 1) | s(2, 2) | ... | s(2, n) | m(T, 2) |
| . | . | . | ... | . | . |
| . | . | . | | . | . |
| . | . | . | | . | . |
| $T_m$ | s(m, 1) | s(m, 2) | ... | s(m, n) | m(T, m) |
| Query Marginals: | m(Q, 1) | m(Q, 2) | ... | m(Q, n) | |

Like the scores, s(i, j) shown in Table 2, the marginals, m(T, i) and m(Q, j), may be present either as simple scalar numbers or text literals, or as complex data structures, containing multiple scalars, literals, or combinations thereof. The marginals are summary or diagnostic statistics for the associated taxon or query, and may come in many forms. For example, taxa marginals may report the number of documents in a taxon, the percentage of the relevant collection that is associated with the taxon, the number of documents in the taxon that are not classified with other taxa, and so on. For further example, query marginals may report the number of documents in the relevant collection that matched or had a certain degree of match to the query, the number of taxa in which there were documents that matched the query or that matched to a certain degree or that numbered above a threshold, and so on. As in the example of Table 2, extensive diagnostic reports may be produced for a row or column. Marginal scores are especially suitable for statistics that are cumulative over a column or row, or that analyze variations over a column or row.

Users, and programs working for users, may manipulate the data structures reporting results (Tables 2 and 3) and may extract reports. Such manipulations include but are not limited to sorting the score data s(i, j) into a desired order by row and/or by column (and their analogs if more than 2 dimensions are present), and in other ways rearranging the order of the rows and/or columns; functionally transforming the scores. Examples of extracted reports include but are not limited to visually highlighting scores that meet a specified condition (e.g., level above a threshold) and charting (plotting, displaying graphically) the scores (or some portion of the scores) for visual inspection. Programs working for users may inspect the scores, rearrange the rows and columns (and their analogs if more than 2 dimensions are present), and search for trends, associations and other forms of patterns among the scores. Users may also manipulate the data structures reporting results (Tables 2 and 3) in order to display the contained information in various different ways, known to those skilled in the art of information display.

The structures shown in Tables 2 and 3 may be generalized to 2 or more classification schemes and/or 2 or more distinct query sets, giving a "table" or array with 3 or more dimensions.

A further example, a "classification-classification mode," is shown in Table 4, in which both axes represent distinct taxa.

TABLE 4

| Taxa 1: | Taxa 2: | | | |
| --- | --- | --- | --- | --- |
| | $T_1^2$ | $T_2^2$ | ... | $T_n^2$ |
| $T_1^1$ | s(1, 1) | s(1, 2) | ... | s(1, n) |
| $T_2^1$ | s(2, 1) | s(2, 2) | ... | s(2, n) |
| . | . | . | ... | . |
| . | . | . | | . |
| . | . | . | | . |
| $T_m^1$ | s(m, 1) | s(m, 2) | ... | s(m, n) |

In a preferred embodiment the table is produced as follows. First, a categorized document base (CDB) is created using m taxa of a first classification scheme, "classification scheme 1," based on a source collection, C of documents, D. In consequence documents D in C are associated with each of the taxa in classification scheme 1. Second, a categorized document base (CDB) is created using n taxa of a second classification scheme, "classification scheme 2," based on the same source collection C of documents D. In consequence, documents in C are associated with each of the taxa in classification scheme 2. As previously described, some taxa may have no associated documents, in which case the associated scores for the associated row or column of the table are nulls, 0s, some other indicator as suits the implementation. Third, the documents in C that are matched by, or classified in, both taxon $T^1_i$ and taxon $T^2_j$ are counted as in the joint taxon $(T^1_i, T^2_j)$ for which the score s(i, j) reports summary information and statistics. Statistics which may be obtained in this fashion include, but are not limited to, statistics analogous to those mentioned for the classification-query mode of Table 2, with the joint taxon $(T^1_i, T^2_j)$ corresponding to the cell $(T_i, Q_j)$.

In an alternate embodiment, each taxonomy is used to classify a document collection. It is allowed (but not required) that each classification scheme may be applied to categorize a different collection of documents. Thus, taxonomy 1, $T^1$ is applied to document collection $C^1$, taxonomy 2, $T^2$ is applied to document collection $C^2$, . . . , and taxonomy t, $T^t$ is applied to document collection $C^t$, where the various collections, $C^i$, may be distinct. Then, the documents classified by an individual taxon x of classification scheme y and collection z, named by $D_{x,y,z}$, are combined to form and be treated as a single document for the purposes of deriving association scores, which are obtained by using an IR association matching function, preferably one that returns a measure of similarity between two documents. Thus, a generic entry in the table, s(i, j), represents a match score between the combined documents in taxon i of classification scheme $T^1$ and the combined documents in taxon j of classification scheme $T^2$ (mutatis mutandis for tables or arrays of more than two dimensions). As an example, the table has 2 dimensions, with classification schemes $T^1$ and $T^2$ being used for both dimensions on a common collection of documents. In this special case, the scores may represent measures of similarity between documents associated with two taxa. Among other purposes, this information is useful and valuable to users who wish to diagnose the discriminative success of the applied classification scheme.

In addition, scores may be reported as complex data structures. For example the distribution of matches in a category may be presented in some form (such as a box plot or an array of values). In one preferred embodiment, a number of scores (simple and/or complex) are made available to the user or to a program executing on behalf of the user.

In other embodiments, relationships other than AND (logical conjunction, ^) are supported in associating the classifications. For example, the documents in C that are matched by, or classified in, taxon $T^1_i$ @ taxon $T^2_j$ may be counted as in the joint taxon ($T^1_i$, $T^2_j$) for which the score s(i, j) reports summary information and statistics, where @ may be any of a variety of relationships, including but not limited to: logical conjunction (AND, as above), logical disjunction (OR), logical negation or complement (-), as well as other relationships such as "appears next to" and "appears before."

The remarks on further uses with reference to Table 3 apply mutatis mutandis to Table 4 uses as well.

A further embodiment, illustrated schematically in Table 5, is a "query-query mode," in which both axes of the table are provided by sets of queries.

TABLE 5

| Queries 1: | Queries 2: | | | |
|---|---|---|---|---|
| | $Q_1^2$ | $Q_2^2$ | ... | $Q_n^2$ |
| $Q_1^1$ | s(1, 1) | s(1, 2) | ... | s(1, n) |
| $Q_2^1$ | s(2, 1) | s(2, 2) | ... | s(2, n) |
| . | . | . | ... | . |
| . | . | . | | . |
| . | . | . | | . |
| $Q_m^1$ | s(m, 1) | s(m, 2) | ... | s(m, n) |

The table may be produced analogously to Tables 2 and 4, once a source collection of documents is identified, C. From this point, queries 1 and 2 may be viewed as classification schemes, and so the case reduces mutatis mutandis to the case shown in Tables 2 and 4. Marginals may be added as appropriate to the rows and/or the columns of Table 4 or Table 5, as illustrated by the difference between Table 3 and Table 2.

In an alternative embodiment, the queries individually constitute individual documents, and the scores, s(i, j) of Table 5 are produced from IR association matching functions. The table entries may then represent measures of similarity between different documents. Among other purposes, this information may be useful and valuable when there is a natural ordering on, or grouping of, the documents/queries (e.g., by time or other classification) and users wish to examine patterns that arise across these natural orderings or groupings.

In Step 216, the user may filter the hits retrieved by reviewing the hits and determining whether the hit is reasonable in view of the identified commodity or in view of predetermined parameters set for a given search, e.g., industries that should not be considered. For example, if the identified commodity is aluminum, and a query of the properties of aluminum was found in hits relating to diapers, and the diaper industry is one in which aluminum would never be used, or is an area the requesting customer would never enter into, the user may filter out any hits that are related to diapers, thus narrowing the number of hits to be reviewed. This could require reconsideration of any or all of Steps 204, 206, 208, and 210.

Similarly to the ability to filter the retrieved documents, the user may be able to expand the list of hits found by analyzing the hits-received and generating broader or narrower properties that were not considered in the initial generation of properties in Step 204. Generation of these alternate properties may then require the user to revisit any or all of Steps 206, 208, and 210 to redefine the collection of documents to search and/or to conduct a search on a new set of queries and/or using a new IRS.

The search in Step 212 is then repeated using the revised premises. As stated above, in the case of a narrowing revision, the file(s) containing the previous list of hits may be used as a selected collection of documents for the revised search.

Once the search in Step 212 is considered satisfactory, in Step 218 the user or the automated process decides whether to add another dimension to the array by further searching the existing array according to a third taxonomy or set of queries. Although a two-dimensional array is commonly used for presentation of information to human users, three-dimensional arrays can be used where the amount of immediately visible data in each cell is small, for example, by applying graphical display tools to render the array transparent, so that internal cells can be seen, by highlighting selected cells or layers or the information therein, and so on. Arrays with any number of dimensions can be presented by a system that displays only selected planes within the array at any time.

In an embodiment, each cell in the array contains a visible and/or machine-readable number indicating an IR score derived from a matching function. Examples of such scores are the number of hits assigned to that cell, and measures of the similarity or association of the hits to the original query. In addition, a link to the data file or files containing those hits. Alternatively, or in addition, the cell may contain a link to a file or report containing analysis data concerning the hits.

In Step 210, upon review of the hits that are found in particular cells of the array, possible applications are identified and defined. These possible applications may relate to different uses of the identified commodity that were not considered in the past. The applications may be identified by examining the documents that are associated with identified properties of the commodity, and fall within specific taxa of the classification, but are not associated with the actual commodity. If these documents relate to a particular category or industry, then an association may be made between the commodity and the particular category. Returning again to the example discussed above, if the drug thalidomide (commodity) has a property of angiogenesis, and there are documents relating to angiogenesis that are not related to thalidomide, and some of the documents not related to thalidomide can be categorized as being about some form of cancer, then an association may be hypothesized that thalidomide may interact with cancer through the angiogenesis property.

Examination of the documents and determination of a possible new commodity association with a category is preferably accomplished using human judgment. Although it is preferable to use human judgment, this examination and determination may be automated. For example, an automation method may rank order the properties identified in Step 204 based on the strength of their association with the documents in a selected subclass; or rank order the documents in a selected subclass based on the strength of their association with a selected property. Although two methods of automatically generating a possible opportunity have been disclosed, other methods of generating possible meaningful opportunities may be utilized and fall within the scope of the present invention.

The user, upon examining and determining any possible opportunities, may then start the search method again utilizing properties that were identified from the method disclosed above and may or may not have been considered before.

The search method and system of the present embodiment innovatively combines principles and techniques from Information Retrieval and matches commodity descriptions with potential applications and industries.

Although the method of the present embodiment has been disclosed as generating possible novel applications or unknown properties of a given commodity, as defined herein, alternatively, the method and system of the present embodiment may generate a commodity, as defined herein, from a given application, use or market. Returning again to the example used hereinbefore, if an application is identified, such as cancer treatment, the method and system of the present embodiment returns unanticipated or novel commodities, such as thalidomide, using properties or descriptive words of the application.

In an initial stage of the examination, the user may inspect the array of cells for patterns or other phenomena visible in the data actually displayed in the array, without yet drilling down to the underlying documents themselves. For example, the user may look for cells with anomalously high or anomalously low numbers of hits, and especially for rows of cells where a taxon in the classification has anomalous numbers of hits relative to a high proportion of the queries of Step 210. To aid in visualization or other analysis, the number of hits in each cell may be normalized to suppress variations in the total number of hits per taxon or per query. Where an objective formula for identifying interestingly anomalous cells or rows is available or can be provided, the inspection may be automated. One of the queries may be the commodity itself, and taxa that have a high number of hits for the commodity may be given a negative weighting if only novel uses for the commodity are being sought, on the assumption that taxa having a high number of hits for the commodity are likely to represent uses already known.

Where those rows apparently of interest tend to show a consistent variation from one query to another, that may indicate that some queries are better than others at discriminating the rows of interest, which may assist in reformulating the queries at Step 216.

This embodiment discloses a method of providing information beyond that which is generally associated with the subject commodity. Access to this expanded information allows the user to expand the scope of the usefulness of a commodity in order to find uses, applications, and markets for the commodity that were not, and would not have been, originally considered by the user. Alternatively, the present process allows the user to find commodities from a given use, application, market or industry that would not have been originally considered.

The present methods involve the interaction of three principal elements: taxonomies, information retrieval methods, and source document collections. These may be configured in a number of preferred embodiments.

Taxonomies

A taxonomy is a classification scheme, the elements of which are called taxa (singular: taxon). The concept is quite general:

Almost anything, including animate objects, inanimate objects, places, events, and activities may be classified according to some taxonomic scheme. Taxonomies are frequently hierarchical in structure. However taxonomy may also refer to relationship schemes other than hierarchies, such as network structures. Other taxonomies may include single children with multi-parents, for example, "Car" might appear with both parents "Vehicle" and "Steel Mechanisms." A taxonomy might also be a simple organization of objects into groups, or even an alphabetical list.

The terms taxonomy, classification system or scheme, and categorization system or scheme have this broad sense and are used in this broad way in the present description. A number of related terms, some with more specialized meaning but still instances of taxonomies in this broad sense, are in current use as terms of art for classifications that may be used with various embodiments of the present invention. These include: ontology, thesaurus, vocabulary, controlled vocabulary, catchwords, meta-model, faceted index, faceted classification, folksonomy, and conceptual framework.

Examples of kinds of taxonomies (ontologies, controlled vocabularies, etc.) include: Product Classifications, such as the United Nations Standard Products and Services Code, the United Nations Central Product Classification, or product catalog classifications by which vendors, portals, and other agents organize products for search an viewing by their customers and other users; Patent Classifications, such as the United States Patent Classification (USPC) or the International Patent Classification; Industry Classifications, such as NAICS (North American Industry Classification Scheme), SIC (United States Standard Industrial Classifications), ISIC (International Standard Industrial Classification of all Economic Activities), SITC3 (Standard International Trade Classification); activity classifications, such as WordNet (Verb relationships), United States Bureau of Labor Statistics Standard Occupation Classification System (SOC); time/date classifications, such as those provided by the ISO; location/place classifications, such as US GSA Geographic Locator Codes (US GSA GLC), United States Direct Marketing Areas (DMA); bibliographic, archival and museum classifications using thesauruses and controlled vocabularies, such as the Library of Congress Classification system (LoC), the Art and Architecture Thesaurus, the Union List of Artist Names, the Getty Thesaurus of Geographic Names (TGN), the UNESCO Thesaurus, the Cook's Thesaurus; education classifications, such as UK Joint Academic Coding System (JACS), UK Higher Education Standard Authority Coding (HESACODE); computing classifications, such as the ACM Computing Classification System; medical classifications such as ICD10 (International Classification of Diagnoses), ICPC (International Classification of Primary Care), CPT (Current Procedural Terminology), US FDA Classification of Medical Devices; company classifications, such as Fortune 500, S&P 500, INC 500.

In addition, the following are further examples of taxonomies that can be used in embodiments of the present invention: the Linnaean taxonomy, for classifying living beings; the periodic table for classifying the elements; various product classification systems, e.g., as used for import and export control; electronic dictionaries, such as WordNet; electronic encyclopedias, such as the Wikipedia; categorized electronic knowledge bases, such as Cyc (http://www.cyc.com/ and http://www.opencyc.org/); graphical taxonomies such as workflow diagrams, flow charts, and organizational charts; International classifications such as the Nice Agreement concerning the International Classification of Goods and Services for the Purposes of the Registration of Marks, the International Classification for Industrial Designs under the Locarno Agreement, the International Classification of the Figurative Elements of Marks under the Vienna Agreement; standards specifications, such as MILSPEC; standards from the International Organization for Standardization (ISO); and industry, national, international, and United Nations standards generally.

As an example, in the LoC, at the highest level after the root of the tree, the nodes in the are labeled with single letters of the alphabet, e.g., A for "General Works," B for "Philosophy, Psychology, Religion," T for "Technology," and so on. Single letters followed by single letters constitute the next more specific level, e.g., BC for "Logic" and BF for "Psychology." After that, a numbering scheme is used, e.g. BC 11-39 is for the history of logic. The scheme continues for several levels.

Because different classification schemes have widely varying formats, a file may be created that captures a particular classification scheme and maps the nodes of the particular classification scheme to standard Node ID notations that can be used for generation of a mapping in accordance with embodiments of the present systems and methods.

Another example of a preexisting classification system, or taxonomy, is the United Nations Standard Products and Services Code (UNSPSC), a portion of which is shown in Table 6.

TABLE 6

| EGCI | Segment | Family | Class | Commodity | Title |
|---|---|---|---|---|---|
| 008991 | 10 | 00 | 00 | 00 | Live Plant and Animal Material and Accessories and Supplies |
| 009044 | 10 | 10 | 00 | 00 | Live animals |
| 009339 | 10 | 10 | 15 | 00 | Livestock |
| 000001 | 10 | 10 | 15 | 01 | Cats |
| 000002 | 10 | 10 | 15 | 02 | Dogs |
| 000003 | 10 | 10 | 15 | 04 | Mink |
| 000004 | 10 | 10 | 15 | 05 | Rats |
| 000005 | 10 | 10 | 15 | 06 | Horses |
| 000006 | 10 | 10 | 15 | 07 | Sheep |
| 000007 | 10 | 10 | 15 | 08 | Goats |
| 000008 | 10 | 10 | 15 | 09 | Asses |
| 000009 | 10 | 10 | 15 | 10 | Mice |
| 000010 | 10 | 10 | 15 | 11 | Swine |
| 000011 | 10 | 10 | 15 | 12 | Rabbits |
| 000012 | 10 | 10 | 15 | 13 | Guinea pigs |
| 000013 | 10 | 10 | 15 | 14 | Primates |
| 000014 | 10 | 10 | 15 | 15 | Armadillos |
| 000015 | 10 | 10 | 15 | 16 | Cattle |
| 010976 | 10 | 10 | 15 | 17 | Camels |
| 009340 | 10 | 10 | 16 | 00 | Birds and fowl |
| 000016 | 10 | 10 | 16 | 01 | Live chickens |
| 000017 | 10 | 10 | 16 | 02 | Live ducks |

TABLE 6-continued

| EGCI | Segment | Family | Class | Commodity | Title |
|---|---|---|---|---|---|
| 000018 | 10 | 10 | 16 | 03 | Live turkeys |
| 000019 | 10 | 10 | 16 | 04 | Live geese |
| 000020 | 10 | 10 | 16 | 05 | Live pheasants |
| 009341 | 10 | 10 | 17 | 00 | Live fish |
| 000021 | 10 | 10 | 17 | 01 | Live salmon |
| 000022 | 10 | 10 | 17 | 02 | Live trout |
| 000023 | 10 | 10 | 17 | 03 | Live tilapia |
| 014985 | 10 | 10 | 17 | 04 | Live carp |
| 014986 | 10 | 10 | 17 | 05 | Live eels |

As is evident from Table 6, this is a hierarchical classification system of depth 4: segments, families, classes, and (as leaves) commodities, which latter are identified by having non-00 numbers in the Commodity column of the table in the Figure. The names of the taxa (whether or not they are leaves in the classification system) may be either single terms, e.g., "cats" and "dogs," or they may consist of two or more terms, e.g., "live animals" and "birds and fowl." Following standard usage in this field, we say that the taxa are described with n-grams, word phrases of 1 or more terms, where n is the number of terms. Thus, "cats" is a 1-gram, "live animals" is a 2-gram (or bi-gram), "birds and fowl" is a 3-gram (or tri-gram), and so on generally. A particular taxon may be more naturally interpreted not as a pure n-gram but as a Boolean combination of n-grams. "Birds and fowl" in Table 6 constitutes an example. Reinterpretation or re-expression of taxa literals (e.g., "birds and fowl") lies within the scope of the present invention. For example, by policy expressions of the form "P and Q" might be re-expressed for purposes of inputting to an IRS as "P AND Q" or "P OR Q," depending on context and current purposes.

Although exemplary classification schemes have been disclosed, any other classification scheme may be utilized as well. Where the search in Step 210 is based on a classification scheme, that scheme is not limited to pre-existing classification schemes. Classification schemes generated by human intuition, based on the hits that have been received or the properties that have been used, for example, may also be utilized by the user. The present invention does not limit the user to selecting one classification scheme, multiple classification schemes may be utilized at the user's discretion.

A portion of a classification scheme, consisting of two or more taxa, is also a classification scheme or taxonomy.

Information Retrieval Methods

The purpose of an Information Retrieval System (IRS) is to retrieve as many as possible of the documents, D, in a collection, C, relevant to a query, Q, at the same time retrieving as few of the non-relevant documents as possible. For many purposes certain types of unreliability may be less harmful than other types. In particular, false positives are frequently less undesirable than false negatives, because a false negative is effectively a lost hit, whereas false positives can be screened out in the course of a review of the hits. Examples of purposes where false positives are usually preferred include environmental scanning and business intelligence. When used for such purposes, the IRS may therefore be configured to retrieve all or substantially all of the relevant documents, even at the expense of retrieving more non-relevant documents.

IR systems need one or more matching functions by which they identify relevant and non-relevant documents. There are very many such matching functions commonly in use and the present process may avail itself of any that prove useful, including, but not limited to, a number of different ways of implementing the matching function that are already in use. Some of these different approaches may be classified, at least in part, as follows.

1. String matching views a query as a (character) string (sequence of characters). A determination is made of whether, and if so how often, the string occurs in each of the documents in a given collection. For a given document D in collection C and query Q, the string match function m(Q,D) returns a 0 if the string is not present in the document. If the string is present, the match function may return either a logical 1 or a count of the number of occurrences of the string in the document, depending on the implementation. Further, partial or pattern-based matches are permitted, such as matching the query "color" to both "color" and "colour." This is often achieved with various forms of "wild-card" searching and with regular expression matching. "Stemming," in which a word is shortened to its core part to simplify matching to inflected and derivative forms, may also be used. "Stopping," in which certain very common words that have little content and that do not typically serve to distinguish documents, such as "the," "and," and the like, may also be used. Stemming, stopping, and similar techniques, although most commonly applied to string matching, can be applied to other forms of search query that are based on words.

2. Boolean matching extends string matching to allow logical combinations of search strings in a query. Thus, for example, the query "red OR blue" would match to any document containing either the string "red" or the string "blue" or both. OR is called disjunction and is one of a number of what are called Boolean operators or logical connectives. Conventionally, the term "Boolean matching" includes use of non-logical, non-Boolean operators, such as proximity operators. For example, a query may request matching of "big" appearing within 3 words before "circus." As in the case of string matching, a Boolean matching function will return a 0 for a document if the specified combination of strings is not matched in the document. Similarly, if the combination is present, the match function may return either a 1 or a count of the number of occurrences of the combination in the document, depending on the implementation. Further, partial or pattern-based matches are permitted.

3. An association matching function m(Q,D), for a given document D in collection C and query Q, returns a number (or possibly a collection of numbers) measuring an association between Q and D; typically this is in the form of a score measuring either similarity or dissimilarity or in the form of a rank on the document in the collection. Association matching functions may be either deterministic or probabilistic, the latter typically returning a score that indicates a probability of a document's being relevant to the query. Association matching functions presently in use include in various forms Dice's coefficient, Jaccard's coefficient, the cosine coefficient, the overlap coefficient, and latent semantic indexing.

Association matching functions typically are able to handle large numbers of individual query terms. In consequence, a query may be taken to be as extensive and complex as an entire document. Thus, association matching functions typically are able to produce an association measure between two documents. In effect, document D0 replaces Q and the matching function may be written m(D0,D). Thus, a document may be used as a query.

For the purposes of this embodiment, any matching function such as those commonly in use in Information Retrieval may potentially be used, the decision being made on the basis of practical considerations as well as performance and accuracy considerations.

Various embodiments of the present invention can use established, well-known information retrieval methods in order to match taxa from classification schemes to documents for the purpose of classifying the documents. A large class of information retrieval methods usable in embodiments of the present invention may be specified by two aspects: document representation; and document matching.

A document may be represented in a variety of ways, including ways common in the art of information retrieval, including: by its original form, by a processed form that largely preserves the original words but removes markup and other extraneous elements, and by an inverted index (term-document file or table) that maps a term (word, phrase, iconic element) to a document and/or a position in a document. Other forms of document representation, many of them more complex, are known in the art of Information Retrieval, or may hereafter be developed, and are included among the ways in which documents may be represented for the present purpose.

Matching of taxa, or taxa as augmented with additional search terms as described above, to documents may proceed in any of a variety of ways, including ways already known in the art of information retrieval, including: direct string matching (as literals or as patterns, e.g. with wildcards or conforming to a regular expression), direct Boolean matching, various functional transformations such as tf–idf (term frequency minus inverse document frequency) weighting, cosine measure, various coefficients of association, including but not limited to Jaccard's coefficient, and such known methods as latent semantic indexing and methods related to it.

In short, the present embodiment encompasses using any suitable information retrieval technique, including known information retrieval techniques, primed by a taxonomy or classification scheme, to categorize a document collection by matching individual taxa with documents, which matching may be full (binary, matched or not) or by degree (partial matching, degree of matching). Further, the matching may be done in any of a number of ways, including literal presence of a query term (e.g., the search string is "live cats" and the retrieval system matches it to documents containing the literal string "live cats"), pronunciation (e.g., the search string is "colour" and the retrieval system matches it to documents containing words pronounced similarly, such as "color" and "colour," using, e.g., the Soundex algorithm), and in the case of iconographic information shape, color, or other visible distinguishing characteristics.

"Direct association" is the direct mapping of a hit with a classification subclass using information included with the hit. For example, an exemplary hit, DOC 1, is a patent. As is known to those familiar with patents, each invention is classified by the Patent Office into particular classes and subclasses. Depending on the invention, the Patent Office may classify the invention into a plurality of classes and subclasses. If the user has selected to use the USPTO classification scheme, a direct association of DOC 1 to the classes and subclasses of the USPTO classification subclasses may be conducted using the class and subclass numbers associated with DOC 1 by the Patent Office. In a preferred embodiment, direct association is conducted automatically using the selected classification scheme and a classification node file.

Another example would be to utilize, for example, the LoC classification scheme and associate a hit comprising a LoC call number to the subclass associated with the call number in the LoC classification scheme. Any hit that comprises a classification number of a pre-existing classification scheme can be directly associated with the selected classification scheme using the classification number included with the hit.

"Indirect association" is the association of a hit to a selected classification scheme subclass based on information other than a classification number directly related to the classification scheme. Indirect association may utilize imperfect matching, which uses human judgment as a means of associating a hit with a subclass. Imperfect matching may also use association of information included with the hit that is not able to be directly associated with a subclass, e.g., an ISSN number. An example of a method of imperfect matching uses a sample of the hits that have been retrieved and, using human judgment, associates a hit with a subclass of the selected classification scheme. Then all remaining hits that are similar to the associated hit are also associated with the subclass.

The association of information included with the hit may be utilized in a similar manner as the above disclosed method. A relationship between the information included with the hit and a subclass of the selected classification scheme is determined using table algorithms that consider the subject matter of the hits and the information that may be associated with the subclasses of the classification scheme. As stated, an example is an ISSN included with a hit. The present process determines an association between the ISSN and a subclass of the selected classification scheme. For example, suppose that a "hit" cites an article in the journal Communications of the ACM. The ISSN number is 0001-0782, and would be present in the hit record, typically. The present process extracts the ISSN number from the hit record (by pattern matching on text) and checks to see if that ISSN number exists in the LoC cataloging records.

If the ISSN exists, the system looks up the ISSN, finds the corresponding LoC catalog entry, extracts the LoC classification (taxon) from that catalog entry, and uses the result to map the original article to the specified taxon in an LoC classification file. If the ISSN is not matched to the LoC catalog, an exception report is generated by the system and a human or automated process looks up the LoC call number for that ISSN and/or serial title.

Example Sources of Source Documents

The third principal element in the present system and process is a collection of source documents, which is to be categorized by a taxonomy. Such collections may be obtained in many different ways and from many different sources, including the following: all of the documents on the World Wide Web that are indexed by a search engine, such as Google, Yahoo! etc.; the documents returned by, or identified by, a search or retrieval engine in response to a query request; documents posted at the Web site of an organization; documents posted on the World Wide Web and falling into a standard category, such as blogs, blogs on a general topic, and wikis; published patents or patent applications; regulatory filings, such as SEC documents (10-K, 10-Q, etc.), safety filings, environmental reports, political campaign filings, etc.; legal and administrative records; archives, or portions of archives, maintained by organizations; collections of e-mail messages, SMS text messages, and the like; digital libraries and collections, such as those maintained by the National Library of Medicine; repositories of technical reports, such as those maintained by organizations such as NIST (National Institute of Standards and Technology), universities, and research organizations; archives of newspapers and other periodicals; commercially marketed document collections, such as provided by Factiva, Dialog and LexisNexis; scientific, engineering, professional, or commercial collections, such as Medline and the National Institute of Standards and Technology; standards specifications (including performance specifications) containing substantial amounts of descriptive narrative and/or drawings and illustrations, such as MIL-SPEC, ISO (International Organization for Standardization) documents, and United Nations standards.

Also, any combination of the above may constitute a document collection for the present purpose.

Similarly, it is often useful and valuable, or even required, to be able to search a body of information, collected as records, for the purpose of discovering new information, information that is not contained in any single record of the repository but that resides in, or is apparent from, or emerges from multiple records in the repository. For example, a firm's buying and selling transactions may be stored as records in a relational database system. No single record (of a purchase or a sale) contains the information of whether sales are increasing or decreasing. This information is, however, available by processing multiple records (sales records over a period of time), classifying (e.g., by month) and aggregating (e.g., by summing quantities sold) the information in them. Queries done in these ways-whether directed at data records in a repository or document records in a repository-are thus said to be "pattern-oriented."

Certain elementary pattern-oriented queries may be undertaken successfully with record-oriented technology (e.g., SQL, standard IR systems, including Internet search engines). However, record-oriented technology is generally inadequate to the task of processing non-elementary pattern-oriented queries. In consequence, the field of data mining or KDD (knowledge discovery in databases, aka: knowledge discovery and data mining) has arisen to create knowledge and supply the market with products for supporting pattern-oriented queries in repositories of data records. Similarly, the field of text mining or text data mining has arisen to create knowledge and supply the market with products for supporting pattern-oriented queries in repositories of text records.

As may be seen from the foregoing description, embodiments of the present invention are broadly useful for the purpose of text mining. The present embodiment uses IR systems, including but not limited to standard IR systems, concepts, and technologies in conjunction with existing classification systems (a) to classify collections of document records and (b) to assist in producing numerical statistics for the classified documents, which may be aggregated in various ways and used for decision making.

Information from CDBs produced by the present embodiments, and indeed text mining information in general, will often be noisier and less reliable than information produced by data mining, because data mining can often be based on very precise and reliable data. Nevertheless, text mining information produced with reliance on embodiments of the present invention will often be quite useful and valuable for decision making because required information is not otherwise available; in particular, because data records are not available that produce a better result. Further, for many purposes the breadth of information afforded by textual sources is an important, even essential, asset.

Thus, text mining can often be very useful for such areas and purposes as market research, finding new uses for known commodities, finding commodities that meet given requirements, environmental scanning or monitoring, business intelligence, scenario planning, and landscaping (in the business strategy sense), and investment analysis.

While the foregoing specification has been described with regard to certain preferred embodiments, and many details have been set forth for the purpose of illustration, it will be apparent to those skilled in the art without departing from the spirit and scope of the invention, that the invention may be subject to various modifications and additional embodiments, and that certain of the details described herein can be varied considerably without departing from the basic principles of the invention.

For example, when generating hit files from machine-readable source documents, it is possible to "turn text into data." A datum, or an indicator, is essentially a variable given a numerical value. E.g., variable=height, value=2 meters. To be really valuable, the data, or indicators, need to be put into categories, so a user can discover useful patterns. In the present example, the variable "height," as applied to people, might be categorized by gender, age, ethnic heritage, economic status and so forth. When categorizing documents, it is possible to count various things—words, phrases, number of documents, etc.—and that generates numbers, some of which may be useful to a user.

The numerical data thus extracted can be reported out in tables, fed to visualization routines for graphic display, included in analysis reports such as those mentioned above as associated with cells in an array, and so on. Reports may be presented to a human user, or further analyzed electronically, or both.

Where the description refers specifically to the use of a "search string" as a query, other forms of query may be substituted.

In the interests of simplicity, embodiments of the invention have been described as generating and using two-dimensional arrays or tables. The arrays or tables may be extended to three or more dimensions, even where that is not explicitly stated.

Especially in a mode using a query set for at least one dimension of the array, there will frequently be a substantial number of documents that do not return a "hit" for any $Q_j$. Depending on the intended use of the information, these documents may be ignored, or a column in the array may be assigned for no-hit documents. In a multi-dimensional array using two or more query sets, it may be desirable to assign cells in the array to documents that return hits for some query sets but not for other query sets. The cell for documents that return no hits at all, and optionally also some other cells, for example, cells for documents that return fewer than a threshold number of hits, may be void cells in which no data are entered. Any marginals for a row or column containing a void cell may then be defined specially to compensate appropriately for the presence of void cells.

In a classification-classification mode, it is more likely that all documents will be classified, except documents outside the scope of the classification, which will typically be ignored. However, both in classification-query mode and in classification-classification mode, where unclassified documents do exist under any classification being used, they may be treated in any of the ways mentioned above for documents that return no hit to a query set.

Thus, it is intended that the present invention cover the modifications and variations of this invention provided they come within the scope of the appended claims and their equivalents.

What is claimed is:

1. A computer-based method for determining patterns of information in at least one categorized collection, the method comprising:
   acquiring categorized information comprising at least one source collection consisting of documents, retrievable information other than documents, and combinations thereof, classified with at least a first taxa-based classification scheme;
   acquiring an Information Retrieval (IR) engine and at least one IR query;
   applying the at least one IR query and the IR retrieval engine for assigning numerical scores indicating relevance of each document, retrievable information other than documents, or combination thereof for each category or set of categories in the at least first taxa based classification scheme;
   mapping the numerical scores with regard to the at least first taxa-based classification scheme, and creating therefrom a numerical mapping record, thereby associating the category or categories in the taxa-based classification scheme to the at least one IR query;
   examining the numerical mapping record for presence of one or more patterns of numerical scores; and
   displaying a report comprising the patterns of numerical scores.

2. The method according to claim 1, further comprising generating at least one human-readable image of an array of the numerical scores, or of information generated by analysis of the array.

3. The method according to claim 1, further comprising providing the generated at least one array image or the information generated by analysis of the array, to a customer in commerce.

4. The method according to claim 1, further comprising: providing at least a second taxa-based classification scheme; selecting one or more IR queries and applying same to the categorized information for each category or set of categories in the at least second taxa based classification scheme; applying the one or more IR queries for assigning numerical scores indicating relevance for each document, retrievable information other than documents, or combination thereof, for the at least second category or second set of categories in the categorized information; comparing or combining the numerical data from the applied first category or first set of categories to the at least second category or second set of categories defined with reference to the one or more second IR queries; mapping same and generating at least one array of numerical data relating to documents, retrievable information other than documents, or combination thereof, wherein the at least first category or first set of categories and the at least second category or second set of categories provide axes of the array; and examining the numerical mapping record for presence of one or more patterns of numerical scores.

5. The method according to claim 4, wherein the IR queries describe a property or combination(s) of properties of a commodity, and wherein querying comprises using IR methods and algorithms in conjunction with query terms and patterns of query terms and phrases used to describe the property or combinations of properties.

6. The method according to claim 5, further comprising comparing the numerical data relating to documents, retrievable information other than documents, or combination thereof in different taxa, and reviewing taxa having higher numerical scores.

7. The method according to claim 6, wherein generating an array comprises generating a human-readable image of the array in which a cell displays the numerical scores associated with each taxon of the at least first or at least second taxa-based categorization scheme, and each category that intersect at the cell.

8. The method according to claim 7, further comprising providing at least one of the array image, or of information generated by analysis of the array, or combinations thereof, to a customer in commerce.

9. The method according to claim 7, comprising creating at least one categorized collection, wherein providing the documents, retrievable information other than documents, or a combination thereof, assigned to the at least second category or at least second set of categories, comprises automatically classifying the documents, retrievable information other than documents, or a combination thereof, in the source collection using the IR engine in conjunction with the taxa-based classification scheme(s) to assign one or more of the documents, retrievable information other than documents, or a combination thereof, to the at least one category or set of categories.

10. The method according to claim 9, wherein assigning one or more of the documents, retrievable information other than documents, or a combination thereof to at least a second category or at least a second set of categories further comprises selecting one or more queries; selecting an IR system; querying the documents using the IR system according to the one or more queries; and assigning one or more of the documents, retrievable information other than documents, or a combination thereof, to a plurality of categories defined with reference to the one or more queries.

11. The method according to claim 9, further comprising generating a numerical array comprising a human-readable array image in which a cell displays the numerical scores associated with each taxon of the at least first or at least second taxa-based categorization schemes, or combination thereof, and each category that intersect at the cell.

12. The computer-based method for determining patterns of information in accordance with claim 1, further comprising providing additional taxa-based classification schemes numbering n; selecting one or more IR queries and applying same to the categorized information for each category or set of categories in the n taxa based classification schemes; assigning numerical scores indicating relevance for each document, retrievable information other than documents, or a combination thereof, for each category or sets of categories n in the categorized information; assigning numerical scores indicating relevance for the categories or sets of categories defined with reference to the IR queries; mapping same and generating at least one array of numerical data indicating relevance of each document, retrievable information other than documents, or combination thereof, wherein the categories provide axes of the array; and examining the numerical mapping record for presence of one or more patterns of numerical scores.

13. The method according to claim 12, wherein the IR queries describe a property or combination(s) of properties of a commodity, and wherein querying comprises using IR methods and algorithms in conjunction with query terms and patterns of query terms and phrases used to describe the property or combinations of properties, and wherein generating the array comprises generating a human-readable image of the array in which a cell displays the numerical scores associated with each taxon of categories that intersect at the cell.

14. The method according to claim 12, further comprising comparing the numerical data relating to documents, retrievable information other than documents, or combination thereof in different taxa, and reviewing taxa having higher numerical scores.

15. The method according to claim 14, further comprising providing at least one of the array image, or of information generated by analysis of the array, or, combinations thereof, to a customer in commerce.

16. The method according to claim 1, comprising creating at least one categorized collection, wherein providing the documents, retrievable information other than documents, or a combination thereof, assigned to the at least a one category or at least one set of categories, comprises automatically classifying the documents, retrievable information other than documents, or a combination thereof, in the source collection using the IR engine in conjunction with the taxa-based classification scheme(s) to assign one or more of the documents, retrievable information other than documents, or a combination thereof, to the at least one category or set of categories.

17. The method according to claim 16, comprising creating at least n categorized collections, wherein providing the documents, retrievable information other than documents, or a combination thereof, assigned to the at least n categories or sets of categories, comprises automatically classifying the documents, retrievable information other than documents, or a combination thereof, in the source collection using the IR engine in conjunction with the taxa-based classification scheme(s) to assign one or more of the documents, retrievable information other than documents, or a combination thereof, to the at least n category or categories within the set.

18. The method according to claim 17, wherein assigning one or more of the documents, things other than documents, or a combination thereof to n number of categories or set of categories further comprises selecting one or more queries; selecting an IR system; querying the documents using the IR system according to the one or more queries; and assigning one or more of the documents, retrievable information other than documents, or a combination thereof, to a plurality of categories defined with reference to the one or more queries.

19. The method according to claim 17, further comprising generating a numerical array comprising a human-readable array image in which a cell displays the numerical scores associated with each taxon of the first or at least second taxa-based categorization scheme, or combinations thereof, and each category that intersect at the cell.

20. A computer-based, information management system for determining patterns of information in at least one categorized collection, the system operably comprising:
  memory processing receiver for acquiring categorized information comprising at least one source collection of documents, retrievable information other than documents, or a combination thereof, classified with at least one taxa-based classification scheme;
  memory processing receiver for acquiring an Information Retrieval (IR) engine and at least one IR query into the computerized system, for assigning numerical scores to indicate relevance of the categorized information and map the numerical scores, creating; a numerical mapping record, thereby associating the category or categories in the taxa-based classification scheme to the at least one IR query;
  processor for examining the numerical mapping record for presence of one or more patterns of numerical scores; and
  reporter component for reporting patterns of numerical scores.

21. The system according to claim 20, comprising a computing device causing a program to run, thereby causing the computing device to carry out the receiving, assessing, and assigning steps.

22. The system of claim 20, further comprising a device to identify and report documents corresponding to the patterns of numerical scores in the report.

23. The system of claim 20, further comprising a device to receive at least a second category or second set of categories.

24. The system according to claim 23, wherein a computing device comprises causing a program to run, thereby causing the computing device to carry out the receiving, assessing, and assigning steps.

25. The system of claim 23, further comprising a device to identify and report documents corresponding to the patterns of numerical scores in the report.

26. The system of claim 20, further comprising a device to receive at least n number of categories or set of categories.

27. The system according to claim 26, wherein a computing device comprises causing a program to run, thereby causing the computing device to carry out the receiving, assessing, and assigning steps.

28. The system of claim 26, further comprising a device to identify and report documents corresponding to the patterns of numerical scores in the report.

29. A computer-operated software program for determining patterns of information in at least one categorized collection of documents, the program embodied in a non-transitory machine-readable medium which, when running on a computer causes the computer to:
   receive an acquired categorized information comprising at least one source collection of documents, retrievable information other than documents, or combinations thereof, classified with at least one taxa-based classification scheme;
   acquire an Information Retrieval (IR) engine and at least one IR query;
   apply the at least one IR query and the IR retrieval engine to assign numerical scores indicating relevance of each document, retrievable information other than documents, or combinations thereof, for each category in the at least one taxa based classification scheme, or for at least one set of categories in the categorized information;
   map the numerical scores with regard to the at least one taxa-based classification scheme for the at least one category or set of categories, and creating therefrom a numerical mapping record, thereby associating the category or categories in the taxa-based classification scheme to the at least one IR query;
   examine the numerical mapping record for presence of one or more patterns of numerical scores; and
   display a report comprising the patterns of numerical scores.

30. The computer-based software program of claim 29, further comprising causing the computer to identify and report documents, retrievable information other than documents, or a combination thereof, corresponding to the patterns of numerical scores in the report.

31. The computer-based software program embodied in a machine-readable medium which, when running on a computing system in accordance with claim 29, further causes the computing system to:
   receive at least one second category or second set of categories, one or more of the documents, retrievable information other than documents, or a combination thereof, being assigned to one or more category or categories within each set;
   apply the IR system;
   generate at least one array of numerical data relating to documents, retrievable information other than documents, or combination thereof, wherein the categories provide axes of the array; and
   create therefrom a numerical mapping record from which patterns are determined.

32. The computer-based software program embodied in a machine-readable medium of claim 31, further comprising causing the computer to identify and report documents corresponding to the patterns of numerical scores in the report.

33. The software program for determining patterns of information of claim 29, further comprising causing the computer to receive acquired categorized information comprising at least n number of categories or n number of sets of categories, and applying the IR system and mapping the documents, retrievable information other than documents, or a combination thereof, to n categories or sets of categories, and create therefrom a numerical mapping record from which patterns are determined.

34. The computer-based software program of claim 33, further comprising causing the computer to identify and report documents, retrievable information other than documents, or a combination thereof, corresponding to the patterns of numerical scores in the report.

* * * * *